May 13, 1941.    G. H. SCHIEFERSTEIN    2,241,527
OSCILLATING MECHANICAL SYSTEM FOR THE TRANSMISSION OF POWER
Filed Dec. 13, 1938
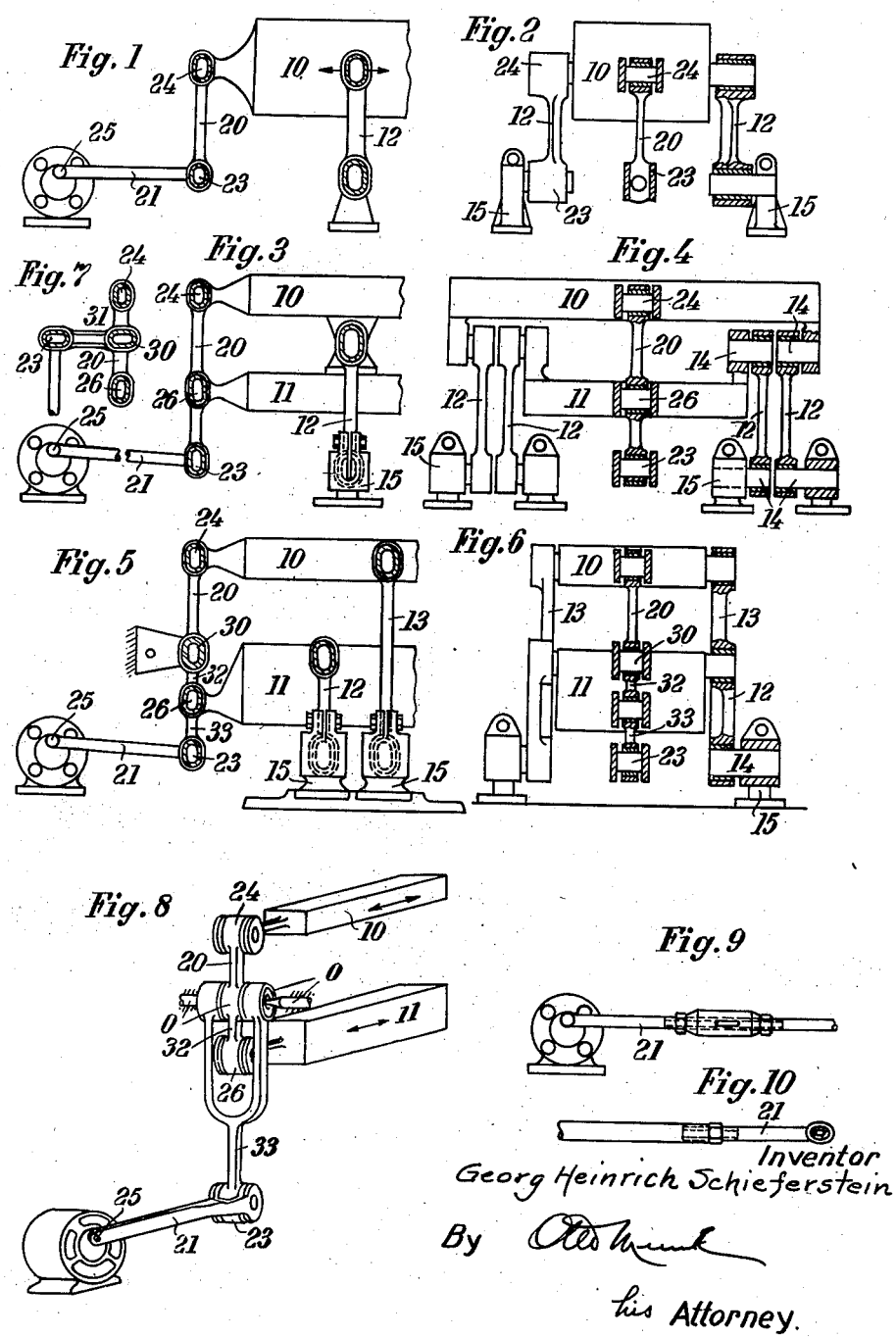
Inventor
Georg Heinrich Schieferstein
By
his Attorney.

Patented May 13, 1941

2,241,527

UNITED STATES PATENT OFFICE 2,241,527

OSCILLATING MECHANICAL SYSTEM FOR THE TRANSMISSION OF POWER

Georg Heinrich Schieferstein, Finowfurt, near Eberswalde, Germany

Application December 13, 1938, Serial No. 245,447 In Germany December 6, 1937

2 Claims. (Cl. 74—61)

This invention relates to oscillating mechanical systems for the transmission of power, of the type in which a driving mechanism is connected to an elastically constrained driven mechanism adapted to oscillate with pronounced natural frequency and variable amplitude through an interposed "loose coupling" adapted to transmit energy to said driven system without substantially interfering with the natural frequency thereof and in which the periodicity of the driving mechanism and the natural frequency of the driven mechanism are substantially in tune. Mechanical systems of this type and loose couplings therefor have been described for example in my prior Specifications Nos. 188,633; 194,299, 237,934, 248,794, 304,151, 349,411, 404,305, 413,689 and 478,946.

In connection with loose couplings it is known that the energy $A_k$ supplied through the loose coupling is equal to the work consumed by damping $A_d$, i. e. that the actual output of the loose coupling $L_k$ is equal to the damping output $L_d$.

In addition, the following relation exists:

$$\frac{A_k}{A_s} = 2\vartheta \tag{1}$$

In Equation 1, $A_k$ denotes the coupling work, $A_s$ the idle energy oscillating in the system and $2\vartheta$ the logarithmic decrement of the damping. $A_k$ is consequently obtained from the following equation:

$$A_k = \Sigma(A_{kn} + A_{kv}) = 2\vartheta A_s \tag{2}$$

where $A_{kn}$ denotes the useful damping of the system and $A_{kv}$ the lost damping.

The problem that the present invention intends to solve consists in keeping the useful damping $A_{kn}'$ of mechanically oscillating systems, as large as possible in all cases and whilst keeping the lost damping $A_{kv}$ as small as possible.

According to experiences gathered in the meantime, this was best possible by the use of a socalled resilient kinetic coupling, because it was thereby possible with the greatest exactness to fulfil the task of the loose coupling of supplying to an oscillating mechanical system in the state movement an accurately determined amount of energy.

The resilient kinetic coupling acts on the mass with a resilient medium the absorption of work $A_k$ of which is to the absorption of work $A_s$ of the resilient medium or media of the oscillating system, in accordance with the foregoing, as $2\vartheta$.

However, there were now relatively few fields in which this idea could be converted into practice, since the resilient means employed in the loose coupling (which have of course to adapt themselves to the oscillatory operation) would have to give up their energy over a relatively large path, in the case of resonance, with a phase displacement of about 90°. In addition, it is impossible to avoid that the crank deflection with the amplitude of the oscillating system (hereinafter called briefly the "oscillator") differs occasionally by 180° on starting up and on dying down, and thus in many cases destroys the resilient coupling means.

According to the state of the art there were heretofore only few springs capable of delivering their energy over so large a path that the foregoing requirements of the coupling were fulfilled, and the energy that such a spring was able to deliver was then in most cases so small, particularly for the construction of resonance machines, that either the resulting frequency or the path obtained in practice was found to be too small.

The present invention is based on the discovery that the foregoing requirements are fulfilled by the elliptical annular spring described in my Specification No. 493,521 and in the specification of my prior application No. 33,902/1937.

This spring absorbs an idle or wattless energy of 2200 mkg., when its dimensions are 140x160x220 mm. and when it is bent out from the middle position to the limit position, in the case of a force still amounting to 4,000 kg. on a lever arm 50 cm. in length and of an amplitude of 36 cms. on said lever arm.

It is seen therefrom that by means of springs of this type the construction of high output resonance machines is facilitated and, moreover, that all the requirements, imposed by the coupling problem on the transmission of power, on the one hand, and the possibility of deflection on the other hand, can be complied with.

In addition to this, however, the conditions of the coupling—that it should transmit as much useful power as possible and as little waste power as possible—which had already previously been found, are still fulfilled.

In respect of this aspect of the problem, the present invention is based on the following further discovery.

Every resonance mechanism consists of two single oscillating mechanisms the characters of which can be sharply distinguished from one another, namely:

(1) The coupling mechanism which has the task of supplying to or withdrawing from the oscillator energy in the form of actual power, or of transmitting such energy from one oscillating mass to the other, and
(2) The oscillator.

Similarly to the mechanism of other prime movers and machines performing work, this oscillator has the task, on the one hand, of bringing the power mkg./sec. to be delivered into a form corresponding to the practical work to be performed (small path with large force or large path with small force) and, on the other hand, of additionally accumulating so much idle energy that an adequate continuous working operation is ensured. In respect of an enlargement of the masses of an oscillator there is thus no restriction regarding dimensioning. If these members are so dimensioned as to be very light, a relatively high frequency and a correspondingly low idle energy are obtained in the appertaining resilient members of suitable dimensions.

If the oscillator be made very heavy, the frequency drops when using the same resilient means and the wattless energy per oscillation increases.

If the frequency is to be relatively high, despite large oscillating masses, the resilient means must be strengthened, i. e. they must be able to absorb the greatly increased wattless energy.

It is thus open to the designer to employ large or small masses for the oscillator in accordance with the problem to be solved.

In respect of the weight and mass of the members which are employed in the coupling mechanism, conditions are quite different in accordance with the present invention. In view of the detrimental dynamic inertia effect produced, they must be kept as low as possible, because the final result is that the kinetic energy:

$$\frac{1}{2}mV_0^2$$

of these masses kinetically loads all existing unsprung bearings, and there produces frictional losses, whereby the efficiency of the whole machine is greatly increased, or in certain circumstances even multiplied.

According to the invention the coupling mechanism must therefore be made aperiodic as a whole or in respect of its individual parts, i. e. the natural frequency of the entire coupling arrangement, on the one hand, and of each individual part must be far higher than the working frequency, in order that as far as possible there should not occur at the existing driving bearings any additional kinetic inertia effects which needlessly increase the coupling energy to be transmitted per oscillation or per second, i. e. the real power supplied, and thus impair the efficiency in wide limits.

$$Ak = \frac{\frac{P_0^2}{w} \cdot T}{2} = \frac{V_0^2 \cdot w \cdot T}{2}$$

where $P_0$ denotes the maximum horizontal force component, $w$ the so-called resistance to effect, $V_0$ the maximum velocity component, and $T$ the duration of the oscillation.

In order to enable the invention to be more readily understood, reference is made to the accompanying drawing, which illustrates diagrammatically and by way of example, various embodiments thereof, and in which:

Figs. 1 and 2 are a side elevation and end elevation of one embodiment,

Figs. 3 and 4 are corresponding elevations of a second embodiment,

Figs. 5 and 6 are corresponding elevations of a third embodiment,

Fig. 7 is a detail,

Fig. 8 is an elevation of a fourth embodiment, and

Figs. 9 and 10 are details.

In Figs. 1 and 2 a mass 10 oscillates between two elliptical springs 12 of the kind hereinbefore referred to, on an open path.

Figs. 3 and 4 show two masses 10 and 11 fastened between elliptical springs 12 and oscillating likewise on an open path.

In Figs. 5 and 6 the same principle is illustrated, with the difference that the two masses 10, 11 and thus also the two springs are of different dimensions.

The simplest loose coupling, and the one most free from losses according to the present state of the art, is produced according to the invention by causing a resilient member 20 to perform reciprocating movements by means of a rotating crank pin 25, by way of a crank rod 21, as shown in Figs. 1 to 6.

The elliptical spring heads 23 and 24 then periodically transmit forces to the oscillator 10, 12 with a phase load between 0 and 90°, and the reaction on the pin 25 exceeds the useful work so much the less, the lighter (the smaller the mass of) the members 20 and 21 in their structural formation.

The shaft of the coupling levers employed must therefore be made of light metal or other material of low specific gravity and adequate strength, in order to attain this end.

In addition, the dynamic influence of the masses must be reduced to an extremely great extent, i. e. as far as possible without endangering safety, by giving the transmitting members 20 and 21 a tubular or otherwise profiled shape of a body of a high moment of resistance.

It is immaterial for the purposes of the invention whether per se known cross-sectional forms or per se known materials of low specific gravity are used for the foregoing purpose.

If it be desired to drive two masses simultaneously in opposite directions, in accordance with Figs. 3 to 6, this can be done—particularly in the case of heavy masses and a relatively loose coupling—by joining the two masses by an elliptical rubber joint 24 and 26 and causing them to perform reciprocating movements by means of the crank 25, through the medium of such a joint 23.

Particularly uniform starting up and dying down of the machine are achieved by selecting an arrangement such as shown in Fig. 7, because in this arrangement the spring head 30 acts at the same time as a point of support.

Particularly in the case of oscillating systems exhibiting a relatively great damping, i. e. little excess wattless energy, the procedure must be as shown in Figs. 5 and 6 in order to obtain a balancing in advance by calculation of the position of the artificial point of support 30, so that the entire coupling mechanism moves about this point in such a manner that the light mass 10 has to travel a correspondingly large path and the heavy mass 11 a correspondingly short path. Both masses are then energised i. e. moved by the crank mechanism 25, 21, 23 and 20 exactly about the point 30, starting from zero frequency, and are exactly balanced in respect of force and inertia effects.

Fig. 8 illustrates a mechanism which takes into account the most complicated circumstances. The two oscillating masses 10 and 11 are of different sizes and oscillate about a vibration nodal point 0 fixed between points or torsional springs. A phase displacement of 180° is thus produced between the two masses 10 and 11, not only in normal operation but also when the oscillation operation is starting up and dying out.

This 180° phase displacement, i. e. the balancing of inertia effects is ensured by the reversing lever 24, 20, 32, 26 and the fixed nodal point 0. The loose coupling 25, 21, 23, 33, 0 is, on the one hand, independent of the aforesaid balancing mechanism, with which it was also connected in Fig. 5, and, on the other hand, transmits its energising oscillating forces to the oscillator without influencing the balancing, because, of course, the rotational axis of the energising elliptical spring coincides with the nodal point of vibration.

Since the resilient joints exhibit no frictional losses or the like, apart from negligible hysteresis losses, such frictional and like losses usually being of the order of 5%, the coupling mechanism, as such, works almost without loss.

The frictional loss in the crank pin 25 of the electric motor or other rotary motor must of course be added where the arrangement as a whole is concerned.

These losses naturally cannot be eliminated in the hereindescribed manner since rotating bearings are concerned.

The resilient support of the masses 10 and 11 is omitted in Fig. 8. It can be provided by link springs as shown in Figs. 1 to 6, or else in other per se known manner. Since in this case also only hysteresis losses are able to have a damping action, it is perceived that the hereindescribed and illustrated mechanism actually approximate more closely to the ideal mechanism in respect of loss and efficiency.

It is obvious that in view of the multiplicity of the practical fields of application, other combinations may also be proposed. The principle of the fundamental employment of resilient elliptical joints for the loose coupling of oscillating mechanical systems is, however, not affected essentially by an alteration of the individual combinations.

The levers employed may be lengthened or shortened by per se known mechanisms, as shown in Figs. 9 and 10, in order thereby to vary the force and path effect of the coupling independently of the frequency. It is naturally immaterial whether in such a combination the outer mounting is held fast and the inner moved, or vice versa, or, finally, whether both are moved relatively to each other.

It must also be pointed out that while a balancing mechanism having relatively little loss and having resilient joints is employed in connection with the loose coupling in the example shown in Fig. 8, in the case of machines of great length, such as conveyors or long shaking screens or the like, other balancing mechanisms may also be used without being connected with a loose coupling, i. e. that the mass balancing device can in principle also be separated from the coupling devices without altering the essence of the invention.

If the loose coupling be completely separated in multi-mass systems from the mass-balancing members, an exact solution is obtained by loosely coupling only one mass in accordance with Figs. 1 and 2, because of course, as is apparent from Figs. 3 to 6, the exact oscillating movement of two masses is effected by the mass-balancing members, i. e. because the mass-balancing members enforce the exact 180° phase displacement and the loose coupling in turn is not able to prevent exact starting up and exact dying out of the oscillation operation.

I claim:

1. An oscillating mechanical system for the transmission of power, comprising a stationary base, two masses suspended for substantially parallel oscillations relative to said base, a prime mover mounted on said base, and a loose coupling between said prime mover and said masses, said coupling including two power transmitting oscillating joints in the form of resilient members secured to said two masses, respectively, a third power transmitting oscillating joint in the form of a resilient member, means to connect said third joint with said prime mover, and a lever arm connecting the three oscillating joints, in which said third oscillating joint is disposed on said lever at the nodal point between the two joints secured to the masses and spaced from each of said joints a distance inversely proportional to the weight of the corresponding mass, said means to connect said third joint with the prime mover including a second lever arm having one end connected to said third joint and carrying on its other end a fourth power transmitting oscillating joint in the form of a resilient member connected to the prime mover.

2. A device comprising oscillatable masses suspended on oscillating levers 12 which are disposed between elastic means, in combination with a main crank drive and a loose elastic coupling between the main drive and the mass, said coupling consisting of an actuating oscillating lever 20 extending obliquely to the direction of movement of the mass, the said oscillating levers 12, 20 being provided at both ends with connecting joints, at least one of the same contains, in each case, said elastic means, each elastic connecting joint comprising an inner elliptical housing and an outer elliptical housing and an elliptical shaped rubber ring disposed between said two housings to serve as elastic means, whereby the elliptical transverse section of the connecting joint extends in the plane of oscillation and the oscillating levers are in each case secured to one of said elliptical housings in such manner that in the case of resonance actuating oscillating lever is capable of preceding the movable mass in the phase for an angle of 90°, whereby the energy necessary for movement is imparted to the total mechanism and a "blind work" is created in the oscillatable structure which, in the case of resonance, amounts to a multiple of the energy actually introduced.

GEORG HEINRICH SCHIEFERSTEIN.